United States Patent [19]

Thomas et al.

[11] Patent Number: 4,707,687

[45] Date of Patent: Nov. 17, 1987

[54] DETECTOR TO DISCRIMINATE BETWEEN TOOL BREAK ACOUSTIC SIGNATURES AND SPIKY NOISE

[75] Inventors: Charles E. Thomas, Scotia; William S. Yerazunis, Troy, both of N.Y.

[73] Assignee: General Electric Company, Schenectady, N.Y.

[21] Appl. No.: 859,533

[22] Filed: May 5, 1986

[51] Int. Cl.$^4$ .............................................. B08B 21/00
[52] U.S. Cl. ................................... 340/680; 340/683; 73/104; 73/660
[58] Field of Search ....................... 340/680, 683, 679; 364/475, 507, 508, 550, 551; 73/104, 660, 593, 658

[56] References Cited

U.S. PATENT DOCUMENTS

| | | | |
|---|---|---|---|
| 4,636,779 | 1/1987 | Thomas et al. | 340/680 |
| 4,636,780 | 1/1987 | Thomas et al. | 340/680 |
| 4,642,617 | 2/1987 | Thomas et al. | 340/680 |

OTHER PUBLICATIONS

S. R. Hayashi et al., "Automatic Tool Touch and Breakage Detection in Turning", Sensors '85, Nov. 5-7, 1985, Detroit.

*Primary Examiner*—James L. Rowland
*Assistant Examiner*—Jeffery A. Hofsass
*Attorney, Agent, or Firm*—Donald R. Campbell; James C. Davis, Jr.; Paul R. Webb, II

[57] ABSTRACT

In some machining conditions the background noise in an acoustic cutting tool break detection system is a low mean level with fairly dense high amplitude noise spikes. A common tool break vibration signature is the sudden appearance of a dense spiky noise. Digital signal pattern recognition logic uses an up/down counter to reject the noise on the basis of its lower spike density while alarming on such a tool break signature. Preprocessed vibration signal samples are tested against a detection threshold and an alarm generated if those whose amplitude is above the threshold amplitude exceeds those below by a preset count.

9 Claims, 5 Drawing Figures

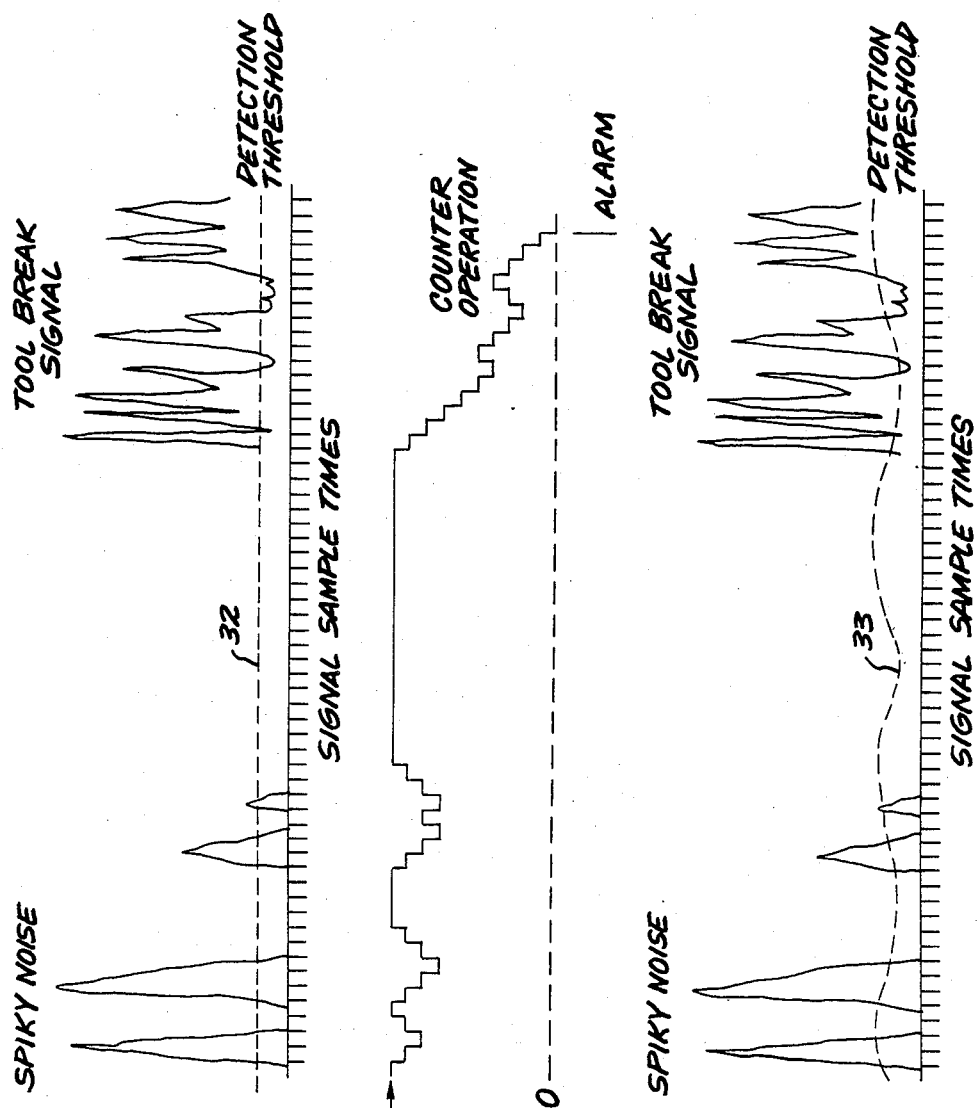

DETECTOR TO DISCRIMINATE BETWEEN TOOL BREAK ACOUSTIC SIGNATURES AND SPIKY NOISE

This invention relates to a system and method for acoustically detecting cutting tool breakage and rejecting background noise spikes that could cause false alarms.

A Machine Tool Monitor to detect broken tools and for part probing is described in several copending, commonly assigned applications and in published technical papers. A single sensor such as an accelerometer is mounted on the machine tool in a location with good coupling to vibrations generated at the tool-workpiece interface. The system is programmed to recognize signal patterns resulting from tool breakage. These patterns are typically abrupt, substantial increases or decreases in the cutting noise mean signal level that persist for a given confirmation period and are caused by sudden changes in cutting conditions resulting from critical geometry changes in the cutting edge. Another pattern is a gradual decrease in the cutting noise signal level due to a series of small breaks or other gradually occurring breakage.

Another type of tool break vibration signature has been observed. Tests with carbide tools cutting Inconel and other metals have shown the high frequency acoustic signal produced by a tool break event is often a dense high amplitude spiky noise. Under these same cutting conditions with an unbroken tool the background noise tends to have a very low mean level, but also a fairly high density of high amplitude noise spikes produced primarily by the chip formation process and chip dynamics after formation. The problem is to reliably detect tool break signatures in the presence of this background noise without false alarms.

SUMMARY OF THE INVENTION

An object of the invention is to provide a system and method for reliably detecting broken tools in one type of tool break signature/background noise situation that tends to be associated with carbide tools cutting various alloys and metals, but can also occur under other machining conditions.

The major difference between this type of tool break signature and the background noise that exists before the tool break event is that the spike density of the tool break signature is somewhat greater. Thus, the fairly high spike densities that sometimes result in normal machining operations can be rejected and do not cause a false alarm, while the still higher spikes densities associated with machining with a broken tool can be detected. The digital processor has, for instance, an up/down counter to reject the noise on the basis of its lower spike density while alarming on the tool break signal.

A band of frequencies within the range of 30 kHz to 100 kHz is selected for use in the tool break detector. The analog signal channel is the same as in the prior-filed applications. The signal from a broadband vibration sensor such as an accelerometer is filtered to attenuate low frequency machine tool noise and fed to a full wave rectifier and low pass filter to detect the signal energy. The preprocessed vibration signal is sampled, the samples converted to digital form, and a mean cutting noise signal is computed. The digital processor further comprises means for discriminating between a tool break signature composed of a dense cluster of noise spikes, and fairly dense spiky noise on the basis of its lower spike density. The amplitudes of the samples are tested against first detection criteria. When the samples meeting the criteria exceed those failing the criteria by a preset number, a tool break alarm is generated. The detection criteria can be that the signal sample amplitude is higher than a fixed threshold amplitude, or higher than a variable threshold amplitude related to the mean cutting noise signal level.

Such a tool breakage detector and detection method are often used in parallel with pattern recognition logic to detect an abrupt and persistent signal level shift tool break signature.

BRIEF DESCRIPTION OF THE DRAWINGS

FIG. 3 shows a preprocessed vibration signal containing moderately dense spiky noise and a tool break signal composed of a dense cluster of noise spikes, and a fixed detection threshold.

FIG. 4 illustrates counter operation for the vibration signal in FIG. 3.

FIG. 5 is the same as FIG. 3 but shows a variable detection amplitude against which samples are tested to determine up and down counts.

DETAILED DESCRIPTION OF THE INVENTION

Figure 1:
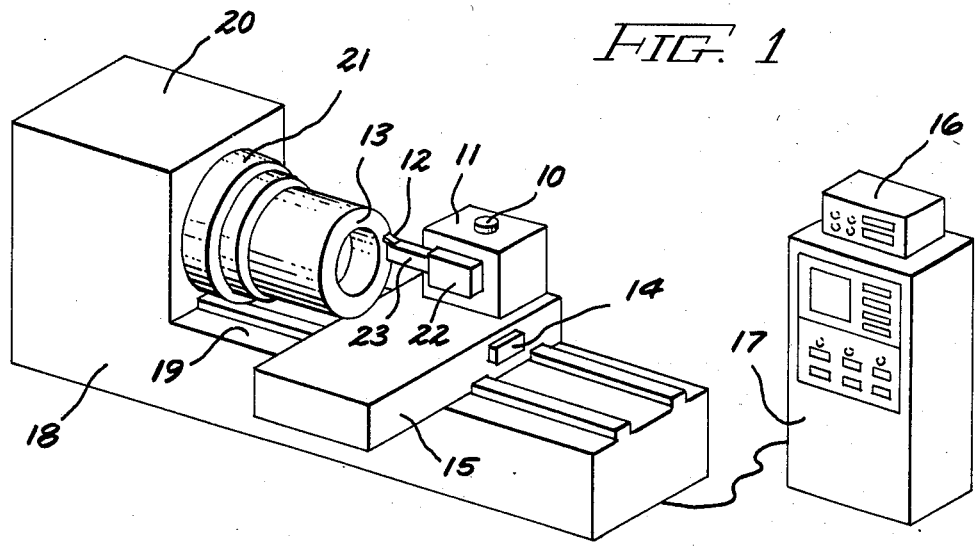
FIG. 1 is a simplified perspective view of a horizontal turret lathe on which a Machine Tool Monitor is installed.

The major components of a Machine Tool Monitor to acoustically detect tool breakage during the machining operation are illustrated in FIG. 1 on a horizontal turret lathe. An accelerometer 10 or other broadband vibration sensor is preferably mounted on the lathe turret 11 or turret base in a location with good coupling to vibrations generated at the interface between the tool 12 and workpiece 13. An analog preprocessor 14 is suitably mounted on the lathe near the turret, such as on the X cross slide 15, to minimize electronic noise pickup. This component contains the circuitry necessary to prepare the vibration signals for analog to digital conversion. A digital processor 16, shown here on top of the Machine Tool (NC) Control 17, uses signal pattern recognition techniques to detect tool break events on the basis of characteristic acoustic signatures. The other illustrated lathe components are the machine frame 18, Z slide 19, headstock 20, chuck 21, tool block 22, and tool holder 23. The turret 11 is rotatable and has several tool blocks but only one is shown. The monitor is for use on machine tools other than lathes.

The desired information about the tool-workpiece interface can be obtained from a band of frequencies above 30 kHz but below 100 kHz without producing problems associated with other ranges. Low frequencies are filtered out to reduce interference from various machine noise sources. High frequencies are ignored because they are more attenuated and distorted by propagating from the tool-workpiece interface to a remote sensor mounting location.

This invention is concerned with detection of tool break events when the vibration signature for normal machining operations with a good tool includes fairly dense high amplitude noise spike clusters superimposed on a much lower mean vibration noise level. Tool break signature detection is complicated because the individual short spikes can be confused with abrupt signal level changes associated with tool break events, and because dense clusters of spikes can be mistaken for shifts in the mean signal level unless the mean level calculation is made very sluggish. The usual suspicion/confirm tool break detection algorithm requires both an abrupt level shift and presistance of that shift. Refer to co-pending application Ser. No. 664,188, now U.S. Pat. No. 4,636,780 filed Oct. 24, 1984, now U.S. Pat. No. 4,636,780 C. E. Thomas et al, "Acoustic Monitoring of Cutting Conditions to Detect Tool Break Events". A dense cluster of noise spikes can provide both of the above, and therefore result in a false alarm when no tool break occurs.

Figure 2:
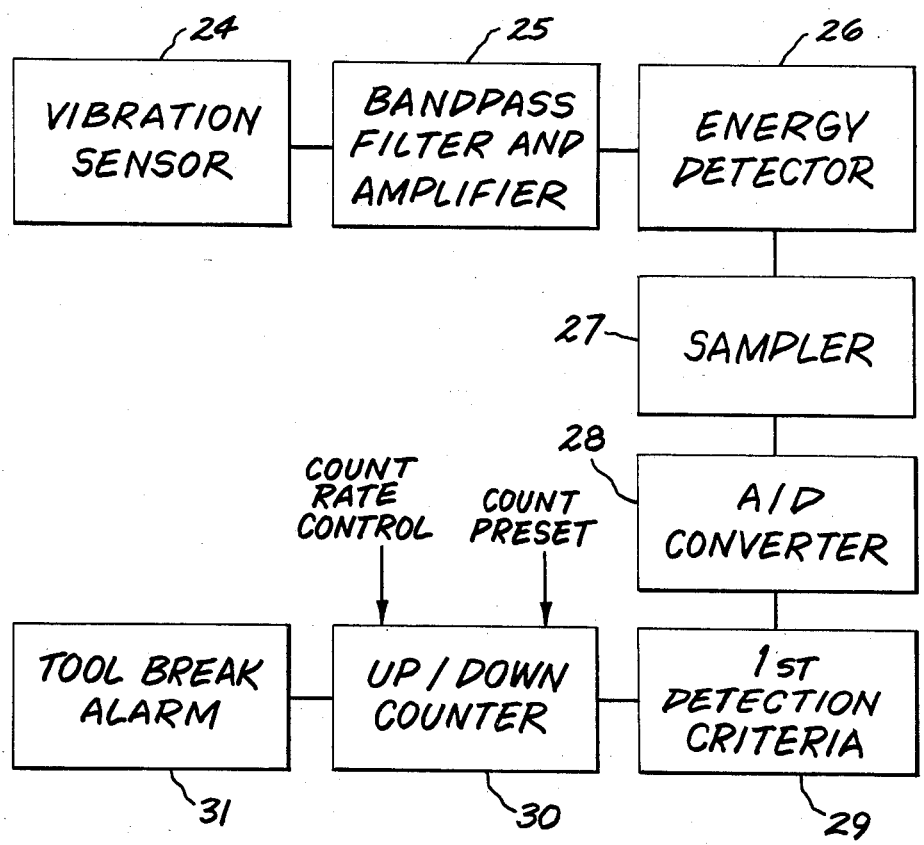
FIG. 2 is a block diagram of a tool break detection system having an up/down counter to discriminate between tool break vibration signatures and high amplitude spiky noise.

The tool break detection system in FIG. 2 discriminates between a tool break acoustic signature composed of a dense cluster of high amplitude noise spikes, and fairly dense high amplitude spiky noise such as occurs in some machining conditions with a good tool. The major difference between this type of tool break signature and the background noise before the tool break event is that the spike density of the tool break signature is somewhat greater. In the preferred embodiment an up/down counter is used in the tool break signature recognition logic to reject the noise on the basis of its lower spike density, while reliably alarming on the tool break signature.

The vibration sensor is, for example, an accelerometer with a usable response from 5 Hz to 70 kHz; the broadband response of the accelerometer is restricted and amplified by the analog channel bandpass filter and amplifier 25. An energy detector 26 comprised of a full wave rectifier and low pass anti-aliasing filter produces a signal energy-versus-time analog waveform. The cut-off frequency of the low pass filter is 500 Hz or less to prevent aliasing from the subsequent sampling operation as long as the sampling frequency is well above the 1 kHz Nyquist frequency.

The output signal from the analog channel is sampled by sampler 27, converted to digital form by analog-to-digital converter 28, and the amplitude versus time traces of the samples are presented to the digital signal pattern recognition logic. First a running mean cutting noise signal is computed using N signal samples. The amplitude of the digital samples is tested at 29 against first detection criteria. These criteria may require the signal sample to exceed a preset threshold amplitude, or the amplitude threshold may be variable and track the mean cutting noise signal level at a fixed differential or ratio, or some combination of these. If the sample amplitude meets the first detection criteria, an up/down counter 30 counts down; if the sample amplitude does not meet the criteria the counter 30 counts up, or remains unchanged if it is already at its preset maximum count. A tool break alarm is generated when the counter counts down to zero.

FIGS. 3 and 4 show the operation of the tool break detection system on moderately dense high amplitude spiky noise and on a tool break signal made up of a dense cluster of high amplitude noise spikes. A simple fixed threshold amplitude and first detection criteria is shown for ease of illustration. At the spiky noise density the counter 30 counts down during noise spikes, but counts back up between them and never counts down to zero. At the higher tool break signature density the counter 30 counts down to zero and alarms. When the samples meeting the threshold amplitude criterion exceed those failing the criterion by a preselected number to which the counter is preset, an alarm is generated. The minimum spike density required to produce an alarm can be determined by the choice of the counter preset number and the number of counts up or down produced per signal sample. Up/down counter 30 has a count rate control and up and down count rates can be individually selected.

FIG. 5 shows a variable detection threshold 33. The amplitude threshold in this case tracks the mean cutting noise signal at a fixed differential or ratio, or is otherwise related to and dependent upon the mean signal level. Another type of counter which begins at zero and counts up to the preset number, rather than counting down to zero, can be used and the operation is the same.

The sources of spiky noise in the vibration signals and what machining conditions do and do not make spiky noise a major problem is not known with certainty. It has been shown by experiments and investigations, however, that dense noise spikes are seldom a problem when monitoring machining of tough aerospace alloys like Inconel with ceramic and ceramic-based cutting tools. This is probably because the continuous cutting noise mean level is high and spikes, although there, are masked. On the other hand, when cutting the same material with a carbide tool, noise spikes of troublesome density are likely to be encountered. This is because, in order to keep the carbide tool from overheating and deforming, the rate of metal removal must be reduced, and this lowers the continuous cutting noise mean level sufficiently so that the noise spikes are no longer masked. Carbide tool use does not equate to a spiky noise problem, but spiky noise problems are often associated with carbide machining operations, with steel and cast iron as well as with Inconel workpiece materials.

The complete tool break detection system may have in parallel with the foregoing, digital pattern recognition logic to detect breakage characterized by a large, abrupt, persistent increase or decrease in signal level. This and other features of an integrated detector are described in the published technical paper "Automatic Tool Touch and Breakage Detection in Turning", S. R. Hayashi, C. E. Thomas, R. K. Davis, W. S. McKnight, and C. R. Roberts, Sensors '85, November 5-7, 1985, Detroit.

While the invention has been particularly shown and described with reference to preferred embodiments thereof, it will be understood by those skilled in the art that various changes in form and details may be made without departing from the spirit and scope of the invention.

The invention claimed is:

1. A system to detect cutting tool breakage while machining a workpiece comprising:
 a vibration sensor to be mounted on a machine tool with good coupling to sense vibrations at the cutting tool-workpiece interface and generate a signal;
 an analog preprocessor having means for filtering out lower frequency machinery noise, detecting the signal energy, and outputting a cutting noise vibration signal in a band of frequencies above 30 kHz but below 100 kHz;
 a digital processor comprised of means for sampling the latter and converting samples to digital form, and for computing a mean cutting noise signal; and means for discriminating between spiky noise and a tool break acoustic signature composed of a dense cluster of noise spikes on the basis of lower spike density of the first, by testing said samples against signal amplitude detection criteria and generating a tool break alarm when the samples meeting the criteria exceed those failing the criteria by a preset number.

2. The system of claim 1 wherein said detection criteria is that the signal amplitude is higher than a fixed threshold amplitude.

3. The system of claim 1 wherein said detection criteria is that the signal amplitude is higher than a variable threshold amplitude which is related to the mean cutting noise signal level.

4. The system of claim 1 wherein said vibration sensor is an accelerometer and said last-mentioned means is comprised of an up/down counter.

5. The system of claim 4 wherein the minimum spike density to produce said tool break alarm is determined by choice of the preset number to which said counter is set and the number of counts up or down produced per signal sample.

6. A method of acoustically detecting broken cutting tools comprising the steps of:

sensing vibrations at the tool-workpiece interface during a machining operation and generating an electrical signal;

preprocessing said signal to filter out lower frequency machinery noise and to detect the signal energy in a chosen frequency band below 100 kHz;

sampling the preprocessed signal, converting samples to digital form, and computing a mean cutting noise signal; and digitally processing the latter to detect a tool break acoustic signature having a dense cluster of high amplitude noise spikes and reject moderately dense high amplitude spiky noise on the basis of its lower spike density, and generating a tool break alarm.

7. The method of claim 6 wherein the last-mentioned step comprises comparing each sample with a detection threshold and generating said alarm when the samples whose amplitude is greater than the detection threshold exceeds those whose amplitude is less by a preset number.

8. The method of claim 7 wherein said detection threshold is fixed.

9. The method of claim 7 wherein said detection threshold is dependent on the mean cutting noise signal.

* * * * *